Figure 1:
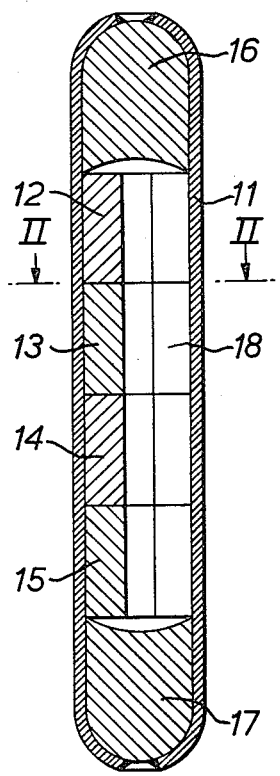

June 15, 1965   L. R. BLAKE   3,189,101
NUCLEAR REACTOR FUEL ELEMENTS
Filed March 12, 1962

United States Patent Office 3,189,101
Patented June 15, 1965

3,189,101
NUCLEAR REACTOR FUEL ELEMENTS
Leslie Reginald Blake, Shepshed, England, assignor to United Kingdom Atomic Energy Authority, London, England
Filed Mar. 12, 1962, Ser. No. 179,121
Claims priority, application Great Britain, Mar. 28, 1961, 11,413/61
8 Claims. (Cl. 176—72)

The present invention relates to sheathed fuel elements for nuclear reactors. It is through the sheathing that heat generated by fission of the fuel is conducted to coolant flowing over the element during operation of the reactor and therefore conditions promoting heat transfer between the fuel and sheathing are needed in order to keep the fuel temperature within an acceptable range.

Expansion of the fuel during irradiation in the reactor is a factor which can make it extremely difficult to maintain a thermal bond of uniform heat transfer characteristics between the fuel and sheathing. Although, in the case of direct contact at the interface between the fuel and sheathing, the initial stages of irradiation act advantageously to improve the contact pressure, the stage is soon reached when this growing pressure overstrains the sheathing and consequently the life of the fuel element is unduly limited.

An alternative to direct contact at the interface is to make the sheathing a clearance fit over the fuel and to provide a continuous intermediate metal bond in the intervening clearance space. A metal of low melting point is usually preferred for this bond, for example, sodium, so that it is liquid within the range of operating temperature of the fuel element and consequently can be expelled from and returned to the clearance space to compensate for differential thermal expansions. Such movements of the bond metal are apt to disrupt the interlayer continuity which in any event is difficult to obtain; consequently the presence of the interlayer cannot be guaranteed and the difficulty arises that severe heating of the fuel will occur at the location of a gap.

The present invention provides a metallically sheathed fuel element for a nuclear reactor in which element an integral length of nuclear fuel within and in direct contact over its outer periphery with the sheathing is slotted to a depth reaching to the centre of the fuel section at all points of the length, resultant voidage internally of the sheathing being filled with a compressible medium. The slotting is made with the object of imparting radial elasticity to the fuel section in a manner analogous to a slitted ring, whereby the contact pressure of the fuel against the sheathing, although increased as expansion of the fuel proceeds, is eased by the elasticity of the section. This feature of the fuel also facilitates manufacture of fuel elements in that a nominal interference fit of the fuel in the sheathing to secure direct contact initially can be specified without the need for close tolerances.

More particularly, according to the present invention, in a metallically sheathed fuel element for a nuclear reactor the fuel content within the sheathing is constituted by at least one integral length of nuclear fuel of tubular section slit continuously from one end to the other and in direct contact over the outer periphery with the sheathing, voidage internally of the sheathing being filled with a compressible medium.

Figure 2:
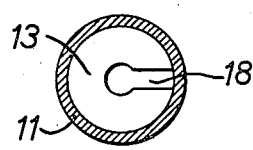

The invention will be further described, by way of example, with reference to the embodiment which is illustrated in the accompanying drawing. In this drawing:

FIGURE 1 is a longitudinal section, and
FIGURE 2 is a cross section on the line II—II of FIGURE 1.

The illustrated fuel element is in the form of a sheathed fuel pin which is to be clustered with other such pins in a fuel element sub-assembly, such as is suitable for a fast reactor. Fitting closely within a cylindrical metal sheath 11 are four fuel segments 12, 13, 14, 15 of generally tubular section stacked between opposing dished faces of end plugs 16 and 17 having rounded extremities. The end portions of the sheath 11 are swaged over these rounded extremities as a reinforcement for joints effected by spot welding between the end plugs and the sheath.

Each of the fuel segments is slit continuously from one end to the other by a straight radial slot, such as 18, the width of which is less than the diameter of the central hole through the segment so as to form with this hole a keyhole outline as best seen in FIGURE 2. Each slitted segment remains an integral mass; its composition may be, for example, enriched uranium metal or uranium dioxide rendered self-coherent by sintering. Although the slots in the individual segments are shown to be aligned, they may be disposed in a random angular relationship. An alternative to the slot being straight is to cut it helically with a pitch several times the diameter of the segment.

The voidage internally of the sheath 11 is filled by a gas chosen to favour the heat transfer and inert towards the fuel of the segments. This gas is present at a superatmospheric pressure, preferably of several atmospheres, in which condition its heat conductivity is improved. Suitable gases selected on this basis are hydrogen and helium.

During manufacture of the fuel pin, the fit of the fuel segments in the can is far less critical than if the slitted shape were not employed. Furthermore, a slight interference fit becomes practicable and is to be preferred. A fine surface finish should be obtained on the interior of the sheath and contamination should be carefully removed before introducing the fuel segments. Although the slitted shape of the fuel segments acts to relieve the sheath from over-straining effects by the fuel expansion occurring during operation, the sheath is constructed to afford high strength, its tensile strength and creep strength are preferably such as to be able to withstand an internal pressure of 10,000 lbs. per sq. inch at a temperature of 600° C. This requirement implies a sheath wall thickness of at least one tenth of the outer diameter. Thus, for fuel pins with an outer diameter within the range of 0.1 to 0.4 inch, the corresponding range of the lower limit of wall thickness is 0.01 to 0.04 inch. A suitable metal for the sheath is one of the alloys of the "Nimonic" type. If the fuel is uranium metal and the possibility of temperatures in excess of 700° C. at the sheath/fuel interface has to be allowed for, a sheath employing a "Nimonic" alloy is made of composite construction so as to afford a layer of a refractory metal in contact with the fuel.

A further advantage of the slitted shape of fuel segment is that the fuel centre temperature is less than if the section were solid. This makes possible the use of the fuel at higher heat ratings.

I claim:
1. A fuel element for a nuclear reactor comprising a metal sheath, and an integral section of nuclear fuel contained within said sheath, said section of nuclear fuel being in direct and intimate contact over its outer periphery with the sheath and being slotted from its outer periphery to a depth reaching to the center of the fuel section throughout the length of said fuel section, opposing walls of the slot being spaced apart to allow for elastic radial deformation of the section of nuclear fuel, the voidage internally of the sheath resulting from the slot being filled with a gaseous medium which is inert towards the fuel.

2. A fuel element as recited in claim 1 wherein said section of nuclear fuel is of tubular cross-section.

3. A fuel element for a nuclear reactor comprising at least one integral section of nuclear fuel, a metal sheath enclosing said section of fuel, the inner surface of said sheath being in direct and intimate contact with the outer peripheral surface of said fuel section, said fuel section being slotted to a depth reaching to the center of the fuel section at all points of its length, opposing walls of the slot being spaced apart to allow for elastic radial deformation of the section of nuclear fuel, the voidage created by said slotting being filled with a gaseous medium.

4. A fuel element as set forth in claim 3 wherein said fuel section is of substantially tubular cross-section.

5. A fuel element as set forth in claim 4 wherein said slotting is continuous from one end of said fuel section to the other.

6. A fuel element as set forth in claim 3 wherein said gaseous medium is at super-atmospheric pressure and is selected from the group consisting of hydrogen and helium.

7. A fuel element for a nuclear reactor comprising a generally cylindrical sheath of metal having high tensile strength and high creep strength, the wall thickness of the sheath being at least one-tenth of the outer diameter of the sheath, nuclear fuel within the sheath in the form of at least one integral length of tubular section, a continuous through-slot through the wall of said tubular sheath from one end to the other, opposing walls of the slot being spaced apart to allow for elastic radial deformation of the section of nuclear fuel, said tubular section being in direct and intimate contact over its outer periphery with the sheathing, and a gaseous medium filling the voids within the sheath, said gaseous medium being inert towards the fuel.

8. A fuel element as set forth in claim 7 wherein the sheath is of composite construction such that its inner surface is a metal layer over a layer of different metal, both such metals having melting points above the normal operating temperature of the fuel element.

References Cited by the Examiner

UNITED STATES PATENTS

| | | | |
|---|---|---|---|
| 2,777,812 | 1/57 | Powell et al. | 176—19 |
| 2,854,737 | 10/58 | Gray | 176—67 |
| 2,863,816 | 12/58 | Stacy | 176—82 |
| 2,915,815 | 12/59 | Bean et al. | 176—67 X |
| 2,982,712 | 5/61 | Heckman | 176—20 |
| 2,983,663 | 5/61 | Bassett | 176—68 |
| 3,022,240 | 2/62 | Bassett | 176—74 |
| 3,043,761 | 7/62 | Reynolds | 176—67 |

FOREIGN PATENTS

| | | |
|---|---|---|
| 210,690 | 2/57 | Australia. |
| 845,181 | 8/60 | Great Britain. |
| 853,302 | 11/60 | Great Britain. |

OTHER REFERENCES

Hausner et al.: Nuclear Fuel Elements, Nov. 24, 1959, page 29.

CARL D. QUARFORTH, *Primary Examiner.*

OSCAR R. VERTIZ, *Examiner.*